United States Patent [19]
Kierstead et al.

[11] 3,911,026
[45] Oct. 7, 1975

[54] SYNTHESIS OF HYDROXYCYCLOPENTEN-1-ONES

[75] Inventors: Richard Wightman Kierstead; Ronald Andrew Lemahieu, both of North Caldwell, N.J.

[73] Assignee: Hoffmann-La Roche Inc., Nutley, N.J.

[22] Filed: Aug. 20, 1973

[21] Appl. No.: 390,141

Related U.S. Application Data

[60] Division of Ser. No. 279,910, Aug. 11, 1972, Pat. No. 3,775,492, which is a division of Ser. No. 823,498, May 9, 1969, abandoned, which is a division of Ser. No. 706,657, Feb. 19, 1968, abandoned, which is a continuation-in-part of Ser. No. 649,441, June 26, 1967, abandoned.

[52] U.S. Cl............................................ 260/617 R
[51] Int. Cl.$^2$......................................... C07C 35/06
[58] Field of Search ............................... 260/617 R

[56] References Cited
OTHER PUBLICATIONS
Le Mahieu et al., "J. Org. Chem.," Vol. 33, pp. 3660–3662 (1968).

*Primary Examiner*—Paul M. Coughlan, Jr.
*Assistant Examiner*—D. B. Springer
*Attorney, Agent, or Firm*—Samuel L. Welt; Jon S. Saxe; Richard A. Gaither

[57] ABSTRACT

This invention relates to a process for the preparation of 2-alkenyl-4-hydroxy-3-methyl-2-cyclopenten-1-ones from a 2-alkenyl or 2-alkynyl-3-methyl-2-cyclopenten-1-one and intermediates therein.

3 Claims, No Drawings

SYNTHESIS OF HYDROXYCYCLOPENTEN-1-ONES

CROSS REFERENCE TO RELATED APPLICATIONS

This application is a division of application Ser. No. 279,910, filed Aug. 11, 1972, now U.S. Pat. No. 3,775,492, which is a division of application Ser. No. 823,498, filed May 9, 1969, abandoned, which is a division of application Ser. No. 706,657, abandoned, filed Feb. 19, 1968, which is a continuation-in-part of application Ser. No. 649,441, filed June 26, 1967, also abandoned.

BACKGROUND OF THE INVENTION

The class of compounds commonly referred to as pyrethrins is generally understood to include the four major active ingredients of pyrethrum viz. Pyrethrin I, Cinerin I, Pyrethrin II and Cinerin II. Pyrethrum is the commercial extract of the herbaceous perennial *Chrysanthemum cinerariaefolium* and is an important source of natural insecticides. The pyrethrins which, as noted above, comprise the major insecticidal constituents of pyrethrum and particularly the two components Pyrethrin I and Cinerin I are especially useful insecticides by virtue of their increased insecticidal potency when used with known synergists, e.g., piperonyl butoxide, their low mammalian toxicity, rapid knockdown or paralytic properties, and the absence of induced insect resistance from exposure to sublethal doses.

Owing to their importance, the preparation of pyrethrins has been the subject of much investigation. There are, however, no commercially acceptable syntheses available for the preparation of the pyrethrins and the entire commercial production of pyrethrins is accomplished by extraction from pyrethrum flowers. Such commercial extraction procedures involve treatment with organic solvents which invariably results in the extraction of substantial amounts of inactive and undesirable impurities necessitating costly and cumbersome purifications in order to obtain insecticidally useful pyrethrins. The novel process of this invention provides a method for the synthesis of several of the pyrethrins and pyrethrin analogs via easily accessible starting materials.

DETAILED DESCRIPTION OF THE INVENTION

The preferred process aspect of the invention pertains to a novel chemical conversion of a 2-alkenyl or 2-alkynyl-3-methyl-2-cyclopenten-1-one to a 2-alkenyl-4-hydroxy-3-methyl-2-cyclopenten-1-one as outlined schematically in the following diagram:

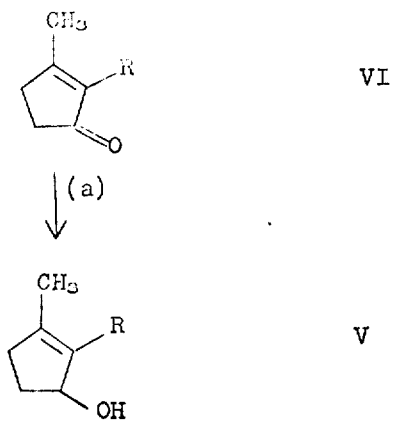

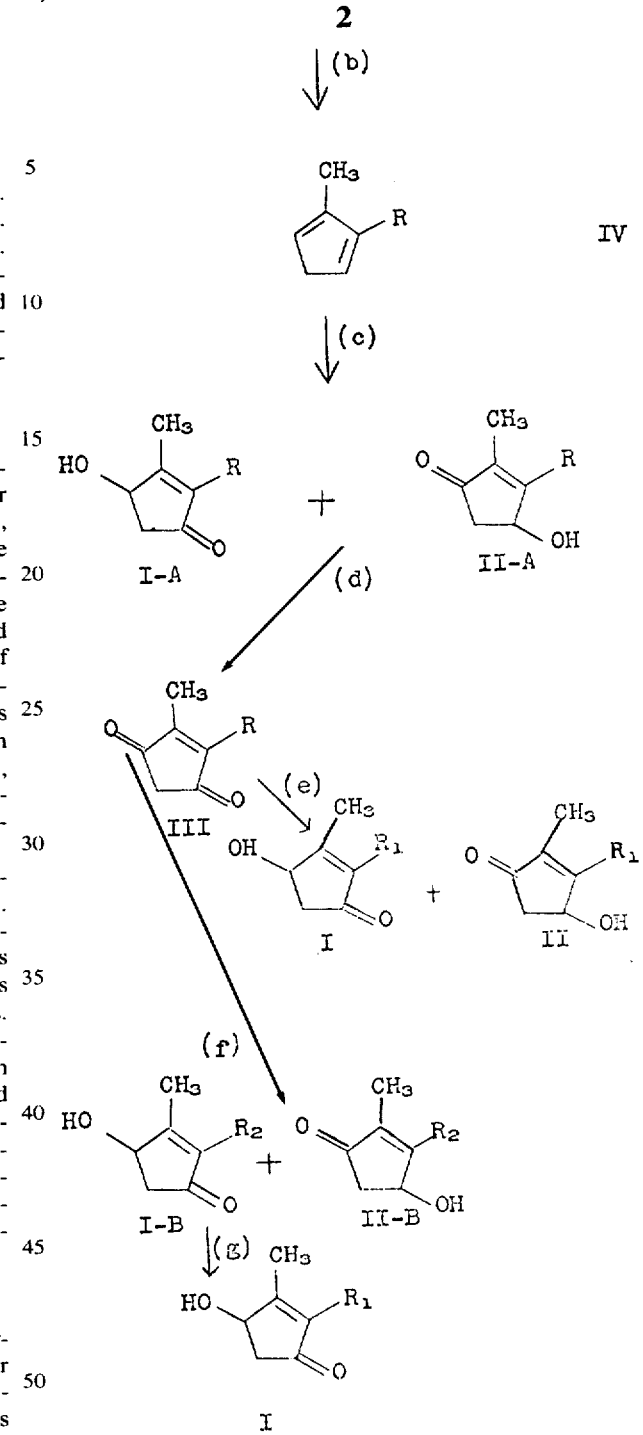

wherein R is selected from the group consisting of alkenyl containing from 3 to 7 carbon atoms, $-CH_2-C \equiv CH$ and $-CH_2-C \equiv C-CH_3$; $R_1$ is lower alkenyl containing from 3 to 7 carbon atoms; and $R_2$ is $-CH_2-C \equiv C-CH_3$ or $-CH_2-C \equiv CH$.

The reduction of the starting material of formula VI to form the alcohol of formula V can be readily effected by treatment with a reducing agent, e.g., a complex metal hydride such as lithium aluminum hydride. Other complex metal hydrides such as sodium borohydride, potassium borohydride, lithium aluminum tri-t-butoxy hydride and the like can also be employed. The reaction is ordinarily carried out in the presence of an inert organic solvent under anhydrous conditions. Suitable solvents are for example, ethers such as diethyl ether, tetrahydrofuran, dimethoxy ethane, etc. The reaction can be conveniently run at room temperature though higher or lower temperatures between about 10°C. and about 50°C. can also be employed.

Dehydration of the alcohol of formula V to form the cyclopentadiene of formula IV can be readily accomplished by treating with any of the usual dehydrating agents, for example, an organic or an inorganic acid dehydrating agent such as p-toluene sulfonic acid, sulfuric acid, phosphoric acid, hydrochloric acid, hydrobromic acid and the like. The dehydration is conveniently carried out in the presence of an inert organic solvent, e.g. hydrocarbons such as benzene, toluene, xylene, etc., ethers and the like at room temperature, higher or lower temperatures e.g., temperatures between about 10°C. and 50°C. can also be employed.

The conversion of the pentadiene of formula IV to the compound of formula I-A is accomplished by oxidation with singlet oxygen. Generation of the singlet oxygen can be achieved by either physical or chemical means for example, by passing oxygen through an electric discharge tube, by irradiating a stream of oxygen in the presence of a sensitizer, by the decomposition of peroxides, or by generation from ozone.

The term "singlet oxygen" is intended to denote oxidation with an active oxygen obtained as indicated above or as described for example by Russian Chemical Reviews, Vol. 34, No. 8, Pages 558–574 (August 1965), particularly pp. 570–571; Journal of the Chemical Society (B), 1966 pp. 1040–1046; the Journal of the American Chemical Society, Vol. 86, pp. 3879–3881 (1964), particularly pp. 3880–3881, and the Journal of American Chemical Society 90, 537 (1968).

The conversion with irradiated oxygen can be conveniently carried out for example, by bubbling a stream of oxygen or oxygen containing gas, e.g., air, through a solution of the diene in an inert organic solvent. As sensitizer there can be employed any of the usual photosensitizing agents as the sensitizing dyes, e.g., the eosins, methylene blue, Rose bengal, erythrosin, chlorophyll and the like. As the activating light there can be employed visible light or light of shorter wave lengths. It is preferred however, to utilize light having a wave length between about 4000 Angstroms and about 8000 Angstroms. Singlet oxygen can be generated chemically by reactions which are per se known, for example, by the decomposition of peroxides. Thus, for example, the oxidation of the diene of formula IV can be carried out by treating a solution of the diene with a mixture of sodium hypochlorite and hydrogen peroxide in methanol or with bromine and alkaline hydrogen peroxide in a two-phase system, i.e., a solvent system composed of an aqueous solvent and a water immiscible organic solvent or with alkaline solutions of organic peracids, e.g., perbenzoic acid. The reaction with singlet oxygen whether physically or chemically generated is conveniently accomplished in the presence of an organic solvent preferably an alcohol, particularly the lower alkanols, e.g., methanol, ethanol, propanol, i-propanol, butanol, etc. The reaction is preferably carried out at room temperature or below. A suitable temperature for the reaction is between about −65°C. and about 25°C.

The product obtained upon reaction of the diene of formula IV with singlet oxygen is usually obtained as a mixture of the isomers of formula I-A and II-A ordinarily in a ratio of about 40 to 60. Oxidation of the mixture of compounds of formulae I and II gives a single product namely the dione of formula III. If R in the compound of formula III is a lower alkenyl, then reduction as in reaction step (e) gives again a mixture of hydroxy ketones of the formula I and II enriched in the amount of the formula I. Mixtures of compounds of formula I and II in a ratio of >70 to 30 respectively were thus obtained by reaction step (e). The oxidation and reduction of the mixture I-A and II-A thus constitutes a method of converting the undesired product II-A into the desired product I.

If R in the compound of formula III is —CH$_2$—C≡C—CH$_3$ or —CH$_2$—C≡CH, the reduction as in reaction step (f) gives again a mixture of hydroxy ketones of the formula I-B and II-B enriched in the amount of formula I-B. Mixtures of compounds of formula I-B and II-B in a ratio >70 to 30 respectively were thus obtained by reaction step (f). The compound of formula I-B can be converted in approximately 100 percent yields to the compound of formula I by selective hydrogenation as in step (g). Therefore, the oxidation and reduction of the mixture I-A and II-A constitutes a method of converting the undesired product of formula II-A into the desired product I-A.

The oxidation of the mixture of hydroxy ketones as in reaction step (d) is readily accomplished by treating with an oxidizing agent. As oxidizing agent there is suitably employed chromic acid and sulfuric acid in water (Jones reagent). Other oxidizing agents preferably the Oppenauer oxidizing agents can also be employed. The oxidation reaction is conveniently carried out in the presence of an organic solvent such as a ketone, e.g. acetone, an ether, e.g. diethyl ether and the like. The oxidation is preferably accomplished at a reduced temperature preferably at a temperature between about 0°C. and 20°C.

The reduction of the dione of formula III as in either reaction step (e) or (f) can be readily accomplished by treating the dione with a reducing agent such as zinc and a lower alkanoic acid, e.g., acetic, propionic, etc. or a Meerwein-Pondorf-Verley reducing agent such as aluminum isopropoxide in isopropanol, aluminum t-butoxide in sec-butanol, etc. The reaction is suitably carried out in the presence of a solvent. As solvent, there can be employed the alcohol component of the reducing agent which is preferably a lower alkanol, such as methanol, ethanol, propanol, isopropanol, butanol, t-butanol, etc. or there can also be employed an inert organic solvent such as toluene, etc. The reaction is suitably carried out at a temperature between about −25°C. and about the reflux temperature of the reaction mixture, i.e., about 100°C.

The compound of formula I-B containing side chains having the acetylenic triple bond can be converted into the compound of formula I wherein the side chain contains an olefinic double bond via reaction step (g) by any conventional method of partial or selective hydrogenation. For instance, the addition of hydrogen can be carried out by catalytic hydrogenation in the presence of palladium catalysts such as, for instance, palladium on calcium carbonate, and palladium on barium sulfate, palladium on charcoal into which quinoline has been absorbed. Another method of hydrogenating the triple bond to a double bond is by hydrogenating in the presence of a lead poisoned palladium catalyst [see e.g., H. Lindlar Helv. Chem. Acta, 35, 446 (1952) and Schechter et al., Journal of American Chemical Society, 74, 4902 (1952)].

The compounds of formula I, which do not contain a terminal olefinic double bond in the alkenyl side chain, can exist in either the cis or trans geometric isomeric form as well as a mixture thereof. The product of formula I can be obtained in any of its geometrical isomeric forms as well as a mixture thereof by selecting the desired geometric isomeric form of compounds of the formula VI which is utilized as a starting material in the process of this invention.

The compound of formula I can exist in the form of its two optically active antipodes as well as a racemic mixture thereof. The process of this invention produces the compound of formula I in the form of a racemic mixture. If desired, the product of formula I can be resolved into its optical antipodes by conventional techniques known to the art. For example, the compound of formula I or I-B can be reacted with a dicarboxylic acid to form a half ester. Suitable dicarboxylic acids include malonic acid, oxalic acid, succinic acid, glutamic acid, adipic acid or phthalic acid. The resulting half ester is then reacted with an optically active base, such as brucine, ephedrine or quinine to produce a diastereomeric salt. The salts, after separation, are then readily converted to optically active alcohols. As an alternative, the alcohol compound of the formula I or I-B can be reacted with an optically active acid, for example, camphorsulfonic acid. The resulting diastereomeric esters are then separated and reconverted to the alcohols.

The compound of formula VI, wherein R is a lower alkenyl, are a known class of compounds which can be prepared by any of the methods known in the art. However, the compound of formula VI, where R is $-CH_2-C\equiv C-CH_3$ or $-CH_2-C\equiv CH$ are new compounds.

The compound of formula VI, where R is $-CH_2-C\equiv CH$, is prepared by reaction of 2-N-pyrrolidino-5-methyl-2-cyclopenten-1-one with propargyl magnesium bromide by a conventional Grignard synthesis wherein the propargyl magnesium bromide is prepared in the manner described by H. Gutmann et al., Helv. Chem. Acta, 42, 719 (1959). The compound of formula VI wherein R is $-CH_2-C\equiv C-CH_3$ is prepared by reacting the sodium enolate of ethyl-3-oxo-6-octynoate with bromoacetone to form ethyl-2,5-dioxo-dec-8-yne-4-carboxylate in the manner described in Schechter et al., J. Am. Chem. Soc., 74, 4902 (1952), and thereafter cyclizing the carboxylate by treatment with a 3 percent aqueous solution of sodium hydroxide at elevated temperatures.

Among the 2-cyclopenten-1-ones exemplifying the starting materials of formula VI which may be suitable employed in the process of this invention, there can be named the following: 2-allyl-3-methyl-2-cyclopent-1-one (allethrone); 2-(but-2-enyl)-3-methyl-2-cyclopenten-1-one (cinerone); 2-(but-3-enyl)-3-methyl-2-cyclopenten-1-one; 2-(pent-2-enyl)-3-methyl-2-cyclopenten-1-one (jasmone); 2-(pent-3-enyl)-3-methyl-2-cyclopenten-1-one; 2-(pent-4-enyl)-3-methyl-cyclopenten-1-one; from which there are obtained the corresponding hydroxylated compounds of formula I, i.e., 2-allyl-3-methyl-4-hydroxy-2-cyclopenten-1-one (allethrolone); 2-(but-2-enyl)-3-methyl-4-hydroxy-2-cyclopenten-1-one (cinerolone); 2-(but-3-enyl)-3-methyl-4-hydroxy-2-cyclopenten-1-one; 2-(pent-2-enyl)-3-methyl-4-hydroxy-2-cyclopenten-1-one; 2-(pent-3-enyl)-3-methyl-4-hydroxy-2-cyclopenten-1-one; and 2-(pent-4-enyl)-3-methyl-4-hydroxy-2-cyclopenten-1-one.

Conversion of the 2-alkenyl-3-methyl-4-hydroxy-2-cyclopenten-1-one products of formula I to the insecticidally useful pyrethrins and pyrethrin analogs is readily accomplished by esterification with appropriate cyclopropane carboxylic acid, e.g., chrysanthemum monocarboxylic acid (chrysanthemic acid), pyrethric acid and the like, which are known in the art. The preparation of pyrethrins and pyrethrin analogs by esterification of substituted 3-methyl-4-hydroxy-2-cyclopenten-1-ones with cyclopropane carboxylic acids has been described, for example, by, among others, L. Crombie et al., JCS p. 3963 (1956), L. Crombie et al., JCS p. 1152 (1950) and Schechter et al., JACS Vol. 71, p. 3165 (1949).

As indicated above, the process of this invention in addition to providing a novel synthetic route for the preparation of the naturally occurring pyrethrin insecticides can also be employed in the preparation of synthetic analogs of the pyrethrins such as, for example, allethrin, which can be obtained by esterification of allethrolone obtained according to the process described herein. Especially preferred are the conversion of allethrone to allethrolone, and cinerone to cinerolone.

This invention will be more fully understood from the specific examples which follow. These examples are intended to illustrate the invention, and are not to be construed as limitative thereof. The temperatures in these examples are in degrees centigrade.

EXAMPLE 1

Preparation of 2-(2'-Cis-butenyl)-3-methyl-2-cyclopenten-1-ol

Cinerone (30.00 g. or 0.2 mole) in 50 ml. of anhydrous ether was added dropwise with stirring over a 2 hour period to a solution of 6.46 g. (0.17 mole) of lithium aluminum hydride in 300 ml. of anhydrous ether at room temperature in a nitrogen atmosphere. After stirring 15 hours at room temperature, the reaction mixture was cooled in an ice bath while 18 ml. of saturated sodium sulfate solution followed by 20 ml. of water was added dropwise. The granular solid was removed by filtration and washed well with ether. The filtrate was dried ($MgSO_4$) and concentrated under reduced pressure to yield a colorless oil. Distillation gave 2-(2'-cis-butenyl)-3-methyl-2-cyclopenten-1-ol, bp 58°–60° at 0.3 mm.; $n_D^{24.5}$ 1.4902.

EXAMPLE 2

Preparation of 2-(2'-Cis-butenyl)-3-methylcyclopentadiene p-toluene-sulfonic acid monohydrate (0.580 g.) was suspended in 600 ml. of anhydrous benzene and heated until solution was achieved. After cooling to room temperature, 26.14 g. (0.17 mole) of 2-(2'-cis-butenyl)-3-methyl-2-cyclopenten-1-ol was added dropwise with stirring over a 1 hour period. The solution became cloudy as water formed and later cleared. After stirring for 3 hours at room temperature, the mixture was washed with 100 ml. of saturated sodium bicarbonate solution, dried ($MgSO_4$) and concentrated on the water aspirator. The resultant oil was transferred to a Vigreux distillation apparatus (6 inch column) and the distillation flask was packed loosely with glass wool to prevent foaming. The apparatus was connected to the water aspirator and heated at 30° for 30 minutes to remove the residual benzene. The condenser was then wrapped with crushed dry ice and the receiving flask cooled in a dry ice bath. On distillation the product boiling at 17°–27°/0.05 mm. was collected in the receiving flask and redistilled to yield 2-(2'-cis-butenyl)-3-methylcyclopentadiene bp 21°–23° at 0.04 mm. $\lambda_{max}{}^{C_6H_{12}}$ 243 (4000).

EXAMPLE 3

Oxidation of 2-(2'-cis-butenyl)-3-methylcyclopentadiene

Method A

A solution of 2.00 g. (0.015 mole) of 2-(2'-cis-butenyl)-3-methylcyclopentadiene in 200 ml. of methanol and 50 mg. of eosin Y was irradiated for 4 hours with a 200 watt bulb clamped 3 inches below the flask while a slow stream of oxygen was bubbled through the mixture. The mixture was cooled slightly to keep it at room temperature. The methanol was then removed on the water aspirator and the residual oil left on a column of 15 g. of basic alumina for 16 hours. Elution with chloroform yielded 1.663 g. of crude product which was chromatographed on 30 g. of silica gel. Solvent polarity was gradually increased and the fractions obtained were examined by TLC. Elution with ether gave 310 mg. of material with an $R_f$ identical to that of authentic cinerolone. Molecular distillation gave a colorless oil which exhibited two peaks on gas-liquid phase chromatography (glpc) (0.5 per cent PEG 4000 MS + 0.5 per cent NPGS on Anak. ABS). Pure samples of both compounds were separated by preparative glpc. The first peak (retention time 12.2 minutes 42 per cent of mixture) exhibited $\lambda_{max}{}^{CHCl_3}$ 2.76 (sharp), 2.90 (broad), 5.87 and 6.06 $\mu$; $\lambda_{max}{}^{EtOH}$ 232 (13,800) and was identified as 4-hydroxy-2-methyl-3-(2'-cis-butenyl)-2-cyclo-penten-1-one. The second peak (retention time 13 minutes; 58 per cent of mixture) exhibited $\lambda_{max}{}^{CHCl_3}$ 2.76 (sharp), 2.90 (broad), 5.88 and 6.06 $\mu$; $\lambda_{max}{}^{EtOH}$ 230 (11,300) and was identified as cinerolone. This mixture of 4-hydroxy-2-methyl-3-(2'-cis-butenyl)-2-cyclopenten-1-one and 4-hydroxy-3-methyl-2-(2'-cis-butenyl)-2-cyclopenten-1-one (cinerolone) was oxidized, as described below, to give the single diketone; 2-(2'-cis-butenyl)-3-methyl-2-cyclopenten-1,4-dione.

Method B

To a stirred solution of 5.36 g. (0.04 mole) of 2-(2'-cis-butenyl)-3-methylcyclopentadiene in 400 ml. of methanol at −10° was added 9.12 g. (0.08 mole) of 30 per cent hydrogen peroxide. The solution was stirred at −10° and 37 ml. (0.084 mole) of 2.27 M sodium hypochlorite solution was added in the course of two hours. After stirring at −10° for 30 minutes, the reaction mixture was acidified with dilute hydrochloric acid and the methanol was removed on a rotary evaporator at about 1 mm. The residual oil was taken up in 50 ml. of ether and was washed with 25 ml. of saturated brine, dried ($M_gSO_4$) and concentrated under reduced pressure to yield a yellow oil. Distillation through a Vigreux column gave three fractions: (1) 50°–93°/0.20 mm.; (2) 93°–115°/0.20 mm.; and (3) 115°–120°/0.20 mm. Fractions 2 and 3 were combined and chromatographed on 60 g. of silica gel. Elution with solvents of gradually increasing polarity and examination of each fraction by TLC gave several impure fractions. Finally elution with 10 per cent ether-benzene and then 100 per cent ether gave an oil with an $R_f$ identical to authentic cinerolone. Distillation gave a colorless liquid (bp 117°–120° at 0.15 mm.) which by glpc analysis contained 36 per cent cinerolone and 64 per cent 4-hydroxy-2-methyl-3-(2'-cis-butenyl)-2-cyclopenten-1-one.

EXAMPLE 4

Preparation of 2-(2'-Cis-butenyl)-3-methyl-2-cyclopenten-1,4-dione

To a stirred solution of 1.0133 g. (0.006 mole) of hydroxy ketone mixture [40 per cent Cinerolone and 60 per cent 4-hydroxy-2-methyl-3-(2'-cis-butenyl)-2-cyclopenten-1-one] in 20 ml. of acetone at 5° was added 1.62 ml. (0.0065 equiv.) of Jones reagent over a 20 minute period. After stirring at room temperature for 15 minutes, the acetone was removed under reduced pressure. Water (10 ml.) was added and the product was extracted with ether (3 × 25 ml.). The combined extract was dried ($M_gSO_4$) and was concentrated under reduced pressure to yield a yellow oil. Distillation gave 2-(2'-cis-butenyl)-3-methyl-2-cyclopenten-1,4-dione, bp 72°–78°/0.20 mm.; $\lambda_{max}{}^{CHCl_3}$ 5.72, 5.88 and 6.09 $\mu$; $\lambda_{max}{}^{EtOH}$ 242 (11,400).

EXAMPLE 5

Reduction of 2-(2'-Cis-butenyl)-3-methyl-2-cyclopenten-1,4-dione

Method A

To a stirred solution of 0.500 g. of 2-(2'-cis-butenyl)-3-methyl-2-cyclopenten-1,4-dione in 25 ml. of methylene chloride and 7 ml. of acetic acid at −20° was added zinc dust (0.968 g.) in portions over a 20 minute period. After stirring at −20° for 1 hour, the solvents were removed on the rotary evaporator at about 1 mm. Ether (30 ml.) was added and the excess zinc was removed by filtration. The filtrate was washed twice with 10 ml. of 10 per cent sodium carbonate solution, dried ($M_gSO_4$) and concentrated under reduced pressure. The residue was distilled to give a colorless oil, bp 106°–108°/0.05 mm. Glpc analysis showed the distillate to contain 74 per cent of Cinerolone and twenty-six per cent of 4-hydroxy-2-methyl-3-(2'-cis-butenyl)-2-cyclopenten-1-one.

Method B

A solution of 220 mg. (1mmole) of freshly distilled aluminum isopropoxide in 10 ml. of anhydrous isopropanol (distilled from calcium hydride) was heated to reflux and 73.2 mg. (0.44mmole) of 2-(2'-cis-butenyl)-3-methyl-2-cyclopenten-1,4-dione in 0.5 ml. of anhydrous isopropanol was added by syringe over 15 minutes. The isopropanol was distilled slowly through a Claisen head over 2 hours keeping the volume in the reaction flask constant by the addition of fresh isopropanol (25 ml. was distilled after 2 hours). The remaining isopropanol was removed on the rotary evaporator at about 1 mm. Ether (20 ml.) and water (5 ml.) were added and the mixture was acidified with dilute hydrochloric acid solution. The extract was dried ($M_gSO_4$) and concentrated to yield a colorless oil which was shown by glpc to contain 84 per cent of Cinerolone and 16 per cent of 4-hydroxy-2-methyl-3-(2'-cis-butenyl)-2-cyclopenten-1-one.

EXAMPLE 6

Preparation of 2-(2'-propenyl)-3-methyl-2-cyclopenten-1-ol 2-(2'-propenyl)-3-methyl-2-cyclopenten-1-one was reduced with lithium aluminum hydride in the manner described in Example 1 to give 2-(2'-propenyl)-3-methyl-2-cyclopenten-1-ol.

EXAMPLE 7

Preparation of 2-(2'-propenyl)-3-methylcyclopentadiene 2-(2'-propenyl)-3-methyl-2-cyclopenten-1-ol was reacted with p-toluenesulfonic acid monohydrate in benzene in the manner described in Example 2 to give 2-(2'-propenyl)-3-methylcyclopentadiene.

EXAMPLE 8

Oxidation of 2-(2'-propenyl)-3-methylcyclopentadiene 2-(2'-propenyl)-3-methylcyclopentadiene was oxidized by the procedure of Method B of Example 3 to give a mixture of 4-hydroxy-2-(2'-propenyl)-3-methyl-2-cyclopentene-1-one and 4-hydroxy-3-(2'-propenyl)-2-methyl-2-cyclopenten-1-one. A pure sample of 4-hydroxy-2-(2-propenyl)-3-methyl-2-cyclopenten-1-one was separated by preparative glpc and exhibited bp 100° at 0.1 mm; $n_D^{25}$ 1.5026.

EXAMPLE 9

Preparation of 2-(2'-propenyl)-3-methyl-2-cyclopenten-1,4-dione

A mixture of 4-hydroxy-2-(2'-propenyl)-3-methyl-2-cyclopenten-1-one and 4-hydroxy-3-(2'-propenyl)-2-methyl-2-cyclopenten-1-one in acetone was oxidized in the manner described in Example 4 to give 2-(2'-propenyl)-3-methyl-2-cyclopenten-1,4-dione.

EXAMPLE 10

Reduction of 2-(2'-propenyl)-3-methyl-2-cyclopenten-1,4-dione 2-(2'-propenyl)-3-methyl-2-cyclopenten-1,4-dione was reduced with zinc dust in acetic acid-methylene chloride as in Example 5 (Method A) to give a mixture rich in 4-hydroxy-2-(2'-propenyl)-3-methyl-2-cyclopenten-1-one (Allethrolone) containing a minor amount of 4-hydroxy-3-(2'-propenyl)-2-methyl-2-cyclopenten-1-one.

EXAMPLE 11

Preparation of 2-(2'-propynyl)-3-methyl-2-cyclopenten-1-one

The Grignard reagent of propargyl bromide was prepared from 2.4 g. (0.1 g. atom) of magnesium turnings, 30 mg. of mercuric chloride and 11.9 g. (0.1 mole) of propargyl bromide in 50 ml. of absolute ether as described by H. Gutmann, G. Riper, P. Zeller and B. Pellmont, Helv. Chim. Acta, 42, 719 (1959). The propargyl bromide was added over a 30 minute period. To this Grignard solution was added dropwise a solution of 13.2 g. (0.08 mole) 2-N-pyrrolidino-5-methyl-2-cyclopenten-1-one [R. T. Dahill, J. Org. Chem., 31, 2694 (1966)] in 50 ml. of absolute ether. The residue after pouring onto ice and 15 percent hydrochloric acid, was refluxed with 40 ml. of 25 percent sulfuric acid for two hours extracted with ether and distilled to yield 2-(2'-propynyl)-3-methyl-2-cyclopenten-1-one.

EXAMPLE 12

Preparation of 2-(2'-propynyl)-3-methyl-2-cyclopenten-1-ol 2-(2'-propynyl)-3-methyl-2-cyclopenten-1-one was reduced with lithium aluminum hydride in the manner described in Example 1 to give 2-(2'-propynyl)-3-methyl-2-cyclopenten-1-ol.

EXAMPLE 13

Preparation of 2-(2'-propynyl)-3-methylcyclopentadiene 2-(2'-propynyl)-3-methyl-2-cyclopenten-1-ol was treated with p-toluenesulfonic acaid monohydrate in benzene as in Example 2 to give 2-(2'-propynyl)-3-methylcyclopentadiene.

EXAMPLE 14

Oxidation of 2-(2'-propynyl)-3-methylcyclopentadiene 2-(2'-propynyl)-3-methylcyclopentadiene was oxidized in the manner of Method A of Example 3 to give a mixture of 4-hydroxy-2-(2'-propynyl)-3-methyl-2-cyclopenten-1-one and 4-hydroxy-3-(2'-propynyl)-2-methyl-2-cyclopenten-1-one.

EXAMPLE 15

Preparation of 2-(2'-propynyl)-3-methyl-2-cyclopenten-1,4-dione

A mixture of 4-hydroxy-2-(2'-propynyl)-3-methyl-2-cyclopenten-1-one and 4-hydroxy-3-(2'-propynyl)-2-methyl-2-cyclopenten-1-one in acetone was oxidized in the manner described in Example 4 to give 2-(2'-propynyl)-3-methyl-2-cyclopenten-1,4-dione.

EXAMPLE 16

Reduction of 2-(2'-propynyl)-3-methyl-2-cyclopenten-1,4-dione 2-(2'-propynyl)-3-methyl-2-cyclopenten-1,4-dione was reduced with aluminum isopropoxide in isopropanol in the manner described in Example 5 (Method B) to yield a mixture rich in 4-hydroxy-2-(2'-propynyl)-3-methyl-2-cyclopenten-1-one along with a minor amount of 4-hydroxy-3-(2'-propynyl)-2-methyl-2-cyclopenten-1-one.

EXAMPLE 17

Hydrogenation of 2-(2'-propynyl)-4-hydroxy-3-methyl-2-cyclopenten-1-one

The hydrogenation of 2-(2'-propynyl)-4-hydroxy-3-methyl-2-cyclopenten-1-one in ethyl acetate solution over lead-poisoned palladized calcium carbonate catalyst in the presence of quinoline was carried out by the procedure of M. S. Schechter, N. Green and F. B. LaForge, J. Am. Chem. Soc., 74, 4902 (1952) until one molecular equivalent of hydrogen was absorbed. The resulting product was 2-(2'-propenyl)-4-hydroxy-3-methyl-2-cyclopenten-1-one. (Allethrolone)

EXAMPLE 18

Preparation of 2-(2'-butynyl)-3-methyl-2-cyclopenten-1-one

Sodium (2.4 g.; 0.1 g. atom) was powdered under xylene and then suspended in 50 ml. of absolute ether. Ethyl-3-oxo-6-octynoate 14.6 g. (0.08 mole) [M. S. Schechter, N. Green and F. B. La Forge, J. Am. Chem. Soc., 74, 4902 (1952)] was added slowly and the suspension was stirred overnight at room temperature. Freshly distilled bromoacetone (24.7 g.; 0.18 mole) was added and the suspension was stirred and refluxed for two hours. Water was added and the product was isolated from the ether layer after acidification of the aqueous layer. The crude product was stirred vigorously with 350 ml. of 3% sodium hydroxide solution at 70° for three hours. After acidification the product was extracted with ether and distilled to give 2-(2'-butynyl)-3-methyl-2-cyclopenten-1-one.

EXAMPLE 19

Preparation of 2-(2'-butynyl)-3-methyl-2-cyclopenten-1-ol 2-(2'-Butynyl)-3-methyl-2-cyclopenten-1-one was reduced with lithium aluminum hydride in the manner described in Example 1 to give 2-(2'-butynyl)-3-methyl-2-cyclopenten-1-ol.

EXAMPLE 20

Preparation of 2-(2'-butynyl)-3-methylcyclopentadiene 2-(2'-Butynyl)-3-methyl-2-cyclopenten-1-ol with p-toluene sulfonic acid monohydrate in benzene was treated in the manner described in Example 2 to give 2-(2'-butynyl)-3-methylcyclopentadiene.

EXAMPLE 21

Oxidation of 2-(2'-butynyl)-3-methylcyclopentadiene 2-(2'-butynyl)-3-methylcyclopentadiene was oxidized by singlet oxygen as described in Example 3 (Method B) to give a mixture of 4-hydroxy-2-(2'-butynyl)-3-methyl-2-cyclopenten-1-one and 4-hydroxy-3-(2'-butynyl)-2-methyl-2-cyclopenten-1-one.

EXAMPLE 22

Preparation of 2-(2'-butynyl)-3-methyl-2-cyclopenten-1,4-dione

A mixture of 4-hydroxy-2-(2'-butynyl)-3-methyl-2-cyclopenten-1-one and 4-hydroxy-3-(2'-butynyl)-2-methyl-2-cyclopenten-1-one in acetone was oxidized in the manner described in Example 4 to give 2-(2'-butynyl)-3-methyl-2-cyclopenten-1,4-dione.

EXAMPLE 23

Reduction of 2-(2'-butynyl)-3-methyl-2-cyclopenten-1,4-dione 2-(2'-butynyl)-3-methyl-2-cyclopenten-1,4-dione was reduced with aluminum isopropoxide in isopropanol in the manner described in Example 5 (Method B) to yield a mixture rich in 4-hydroxy-2-(2'-butynyl)-3-methyl-2-cyclopenten-1-one along with a minor amount of 4-hydroxy-3-(2'-butynyl)-2-methyl-2-cyclopenten-1-one.

EXAMPLE 24

Hydrogenation of 2-(2'-butynyl)-4-hydroxy-3-methyl-2-cyclopenten-1-one

Hydrogenation of 2-(2'-butynyl)-4-hydroxy-3-methyl-2-cyclopenten-1-one in ethyl acetate solution over lead-posioned palladized calcium carbonate catalyst in the presence of quinoline was carried out by the procedure of M. S. Schechter, N. Green and F. B. LaForge *J. Am. Chem. Soc.*, 74, 4902 (1952) until one molecular equivalent of hydrogen was absorbed. The product was 2-(cis-2'-butenyl)-4-hydroxy-3-methyl-2-cyclopenten-1-one.

We claim:

1. A compound of the formula:

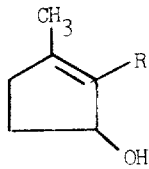

wherein R is alkenyl having from 3 to 7 carbon atoms.

2. A compound according to claim 1 wherein said compound is 2-(2'-cis-butenyl)-3-methyl-2-cyclopenten-1-ol.

3. A compound according to claim 1 wherein said compound is 2-(2'-propenyl)-3-methyl-2-cyclopenten-1-ol.

* * * * *